(12) United States Patent
Hsu et al.

(10) Patent No.: US 11,750,239 B2
(45) Date of Patent: Sep. 5, 2023

(54) FRONT-END MODULE PROVIDING ENHANCED SWITCHING SPEED

(71) Applicant: RichWave Technology Corp., Taipei (TW)

(72) Inventors: Chia-Wei Hsu, Taipei (TW); Chih-Sheng Chen, Taipei (TW); Yu-Hsuan Chao, Taipei (TW)

(73) Assignee: RichWave Technology Corp., Taipei (TW)

( * ) Notice: Subject to any disclaimer, the term of this patent is extended or adjusted under 35 U.S.C. 154(b) by 51 days.

(21) Appl. No.: 17/555,526

(22) Filed: Dec. 20, 2021

(65) Prior Publication Data
US 2023/0136392 A1  May 4, 2023

(30) Foreign Application Priority Data
Nov. 4, 2021  (TW) ................... 110141113

(51) Int. Cl.
*H04B 1/48* (2006.01)
*H04B 1/16* (2006.01)
*H04B 1/00* (2006.01)
*H04B 1/04* (2006.01)

(52) U.S. Cl.
CPC .............. *H04B 1/48* (2013.01); *H04B 1/006* (2013.01); *H04B 1/0483* (2013.01); *H04B 1/1615* (2013.01)

(58) Field of Classification Search
CPC ...... H04B 1/005; H04B 1/0053; H04B 1/006; H04B 1/0483; H04B 1/1615; H04B 1/38; H04B 1/40; H04B 1/406; H04B 1/44; H04B 1/48

See application file for complete search history.

(56) References Cited

U.S. PATENT DOCUMENTS

| | | | |
|---|---|---|---|
| 8,933,858 B2* | 1/2015 | Sabouri | H04B 1/006 |
| | | | 343/860 |
| 9,941,908 B2* | 4/2018 | Bauder | H04B 1/005 |
| 10,707,909 B2* | 7/2020 | Watanabe | H04B 1/48 |
| 10,944,441 B2* | 3/2021 | Medra | H04B 1/16 |
| 2019/0334572 A1 | 10/2019 | Lin | |
| 2021/0297109 A1 | 9/2021 | Ono | |
| 2021/0336639 A1 | 10/2021 | Tsuda | |

OTHER PUBLICATIONS

Office action dated Jul. 7, 2022 for the Taiwan application No. 110141113, filing date Nov. 4, 2021, pp. 1-13.

* cited by examiner

*Primary Examiner* — Quochien B Vuong
(74) *Attorney, Agent, or Firm* — Winston Hsu

(57) ABSTRACT

A front end module includes a first radio frequency (RF) terminal, a second RF terminal, a third RF terminal, a transmission path and a reception path. The transmission path is formed between the first RF terminal and the third RF terminal. The reception path is formed between the first RF terminal and the second RF terminal. The reception path includes a first set of switches, a second set of switches, a third set of switches and an amplifier. An amplifier is coupled to the second set of switches and the second RF terminal. The third set of switches is coupled to the first set of switches and the second RF terminal. When a transmission signal is transmitted to the first RF terminal via the transmission path, the first set of switches, the second set of switches and the third set of switches are turned off.

17 Claims, 4 Drawing Sheets

FRONT-END MODULE PROVIDING ENHANCED SWITCHING SPEED

TECHNICAL FIELD

The present invention relates to a radio frequency circuit, and in particular, to a front-end module providing an enhanced switching speed in a radio frequency circuit.

BACKGROUND

A front-end module is a radio frequency circuit arranged between an antenna and a baseband circuit for transmitting or receiving RF signals. The front-end module typically includes radio frequency switches, filters, and power amplifiers. Front-end modules are used in various communication devices, such as mobile communications, wireless networks (Wi-Fi), Bluetooth, global positioning system (GPS), and so on.

With the continuous development in communication technology, the power demand for RF signals has increased significantly for expanding the radio coverage. As a consequence, the circuit area and insertion loss of the front-end module increase with the increase in the power of the RF signals to enhance isolation during transmitting and receiving the RF signals, resulting in an increase in manufacturing cost and a decrease in circuit performance.

SUMMARY

According to an embodiment of the invention, a front-end module includes a first radio frequency (RF) terminal, a second RF terminal, a third RF terminal, a transmission path, and a reception path. The transmission path is formed between the first RF terminal and the third RF terminal. The reception path is formed between the first RF terminal and the second RF terminal. The reception path includes a first set of switches, a first path, and a second path. The first set of switches includes a first terminal coupled to the first RF terminal, a second terminal, and a control terminal configured to receive a first control signal. The first set of switches is controlled to be on or off according to the first control signal. The first path includes a second set of switches and an amplifier. The second set of switches includes a first terminal coupled to the second terminal of the first set of switches, a second terminal, and a control terminal configured to receive a second control signal. The second set of switches is controlled to be on or off according to the second control signal. The amplifier includes an input terminal coupled to the second terminal of the second set of switches and configured to receive a receive signal, and an output terminal coupled to the second RF terminal and configured to output an amplified signal. The first path and the second path are coupled in parallel between the second terminal of the first set of switches and the second RF terminal. The second path includes a third set of switches, and the third set of switches include a first terminal coupled to the second terminal of the first set of switches, a second terminal coupled to the second RF terminal, and a control terminal configured to receive a third control signal. The third set of switches is controlled to be on or off according to the third control signal. When a transmission signal is transmitted to the first RF terminal via the transmission path, the first set of switches, the second set of switches, and the third set of switches are all turned off.

According to another embodiment of the invention, a front-end module includes a first RF terminal, a second RF terminal, a first set of switches, a second set of switches, and a third set of switches. The first set of switches includes a first terminal coupled to the first RF terminal, a second terminal, a control terminal configured to receive a first control signal, and at least one first transistor. The first set of switches is controlled to be on or off according to the first control signal. The second set of switches includes a first terminal coupled to the second terminal of the first set of switches, a second terminal, a control terminal configured to receive a second control signal, and at least one second transistor. The second set of switches is controlled to be on or off according to the second control signal. The third set of switches includes a first terminal coupled to the second terminal of the first set of switches, a second terminal coupled to the second RF terminal, and a control terminal configured to receive a third control signal, and at least one third transistor. The third set of switches is controlled to be on or off according to the third control signal. A size of each of the at least one second transistor and a size of each of the at least one third transistor are each less than a size of each of the at least one first transistor.

According to another embodiment of the invention, a front-end module includes a first RF terminal, a second RF terminal, a first set of switches, a second set of switches, a third set of switches, a first shunt path, and a second shunt path. The first set of switches includes a first terminal coupled to the first RF terminal, a second terminal, a control terminal configured to receive a first control signal, and at least one first transistor. The first set of switches is controlled to be on or off according to the first control signal. The second set of switches includes a first terminal coupled to the second terminal of the first set of switches, a second terminal, a control terminal configured to receive a second control signal, and at least one second transistor. The second set of switches is controlled to be on or off according to the second control signal. The third set of switches includes a first terminal coupled to the second terminal of the first set of switches, a second terminal coupled to the second RF terminal, and a control terminal configured to receive a third control signal, and at least one third transistor. The third set of switches is controlled to be on or off according to the third control signal. The first shunt path includes a first terminal coupled to the second terminal of the second set of switches, and a second terminal coupled to a reference voltage terminal. The second shunt path includes a first terminal coupled to the second terminal of the third set of switches, and a second terminal coupled to the reference voltage terminal. A quantity of the at least one second transistor is equal to a quantity of the at least one third transistor. When the first set of switches, the second set of switches, and the third set of switches are all turned off, a voltage across each of the at least one first transistor is substantially equal to a voltage across each of the at least one second transistor, and is substantially equal to a voltage across each of the at least one third transistor.

DETAILED DESCRIPTION

Figure 1:
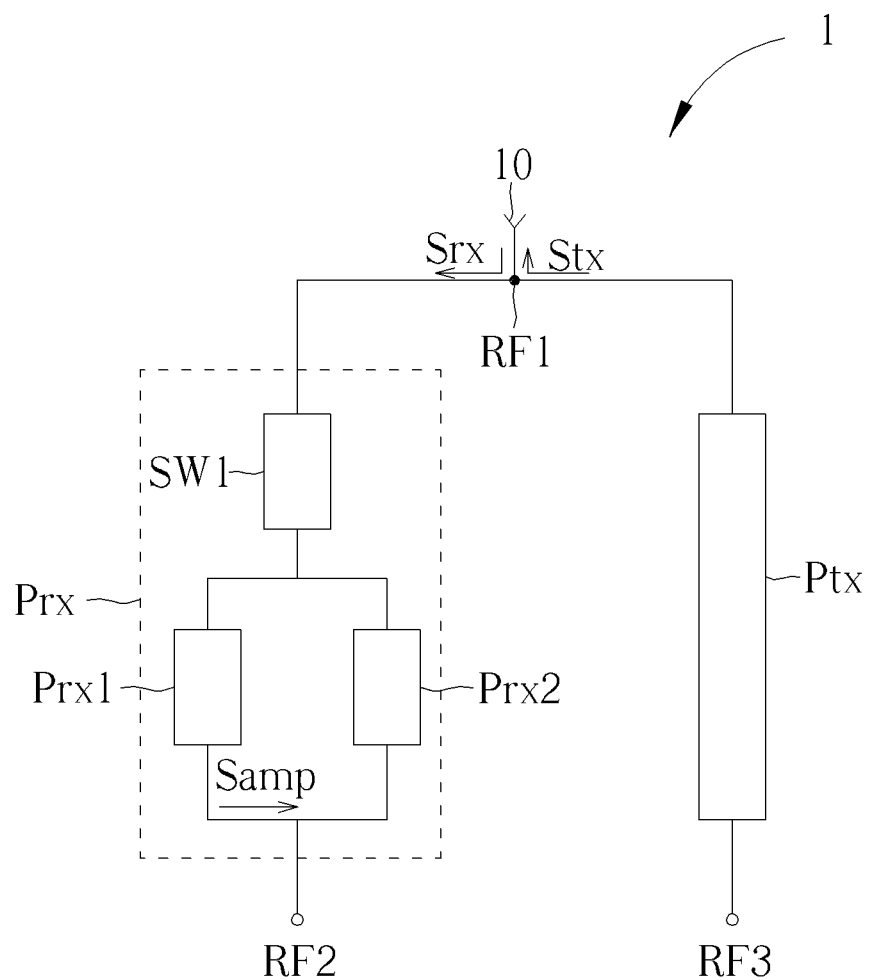
FIG. 1 is a block diagram of a front-end module according to an embodiment of the invention.

Below, exemplary embodiments will be described in detail with reference to accompanying drawings so as to be easily realized by a person having ordinary knowledge in the art. The inventive concept may be embodied in various forms without being limited to the embodiments set forth herein. Descriptions of well-known parts are omitted for clarity, and like reference numerals refer to like elements throughout.

FIG. 1 is a block diagram of a front-end module 1 according to an embodiment of the invention. The front-end module 1 may perform a transmission of a radio frequency (RF) signal Stx or an RF signal Srx.

As shown in FIG. 1, the front-end module 1 includes an antenna 10, an RF terminal RF1, an RF terminal RF2, an RF terminal RF3, a transmission path Ptx, and a reception path Prx. The antenna 10 is coupled to the RF terminal RF1. The transmission path Ptx is formed between the RF terminal RF1 and the RF terminal RF3, and the reception path Prx is formed between the RF terminal RF1 and the RF terminal RF2. When transmitting the RF signal Stx, the transmission path Ptx is conductive and the reception path Prx is non-conductive. When receiving the RF signal Srx, the reception path Prx is conductive and the transmission path Ptx is non-conductive. The reception path Prx includes a first set of switches SW1, an amplification path Prx1, and a bypass path Prx2. In this embodiment, the RF signals Stx and Srx may be a transmit signal and a receive signal, respectively.

Figure 2:
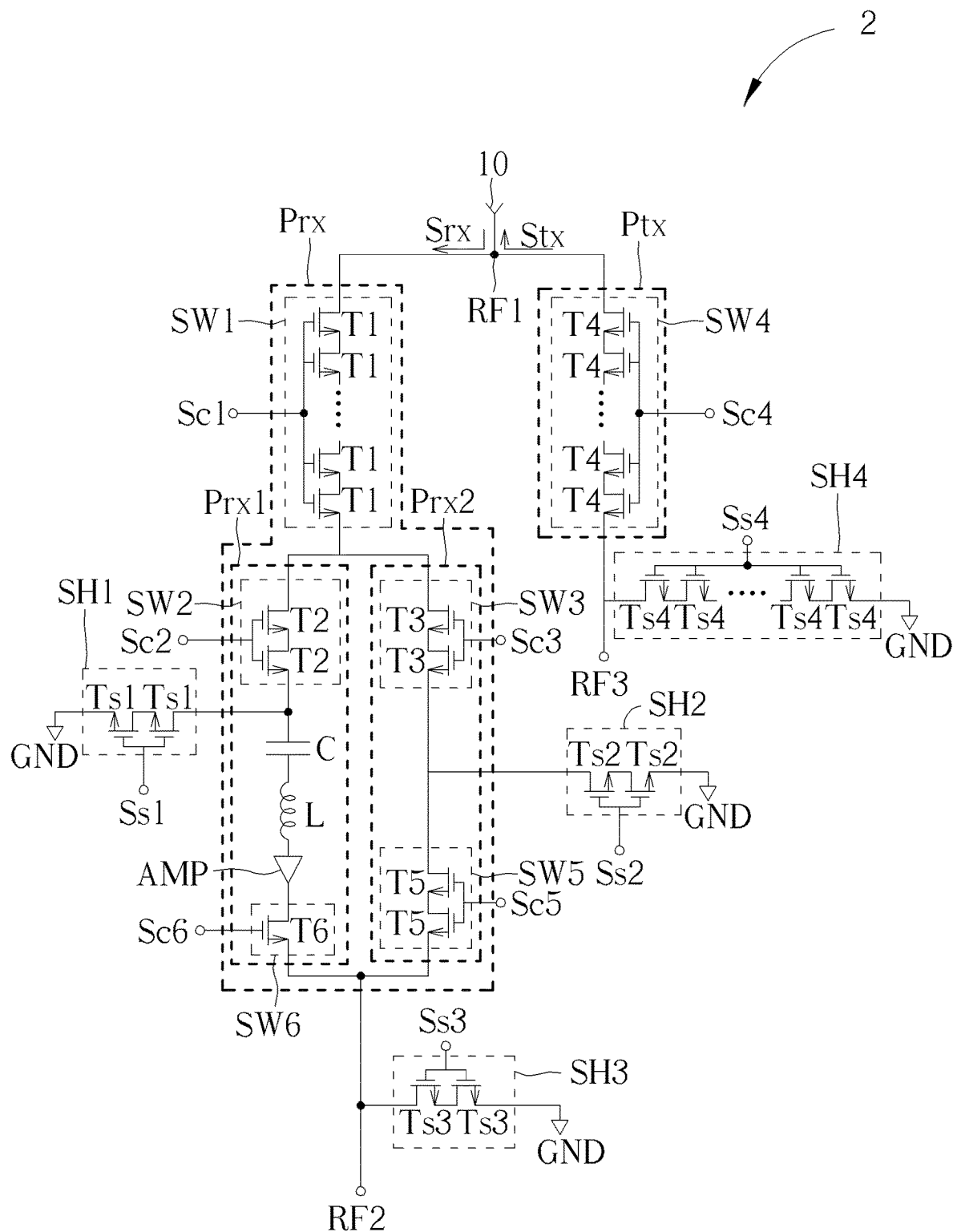
FIG. 2 is a circuit diagram of a front-end module according to an embodiment of the invention.

FIG. 2 is a circuit diagram of a front-end module according to an embodiment of the invention.

As shown in FIG. 2, the first set of switches SW1 includes a first terminal, a second terminal, and a control terminal. The first terminal of the first set of switches SW1 is coupled to the RF terminal RF1, and the control terminal of the first set of switches SW1 is configured to receive the control signal Sc1. The first set of switches SW1 is controlled to be on or off according to the control signal Sc1. The first set of switches SW1 may include N cascoded transistors T1, where N is a positive integer and is determined by circuit requirements. In one embodiment, sizes of the multiple transistors T1 may be equal.

Similar to the reception path Prx, the transmission path Ptx may include a fourth set of switches SW4. The fourth set of switches SW4 includes a first terminal, a second terminal, and a control terminal. The first terminal of the fourth set of switches SW4 is coupled to the RF terminal RF1, the second terminal of the fourth set of switches SW4 is coupled to the RF terminal RF3, and the control terminal of the first set of switches SW4 is configured to receive the control signal Sc4. The fourth set of switches SW4 is controlled to be on or off according to the control signal Sc4. The fourth set of switches SW4 may include at least one cascoded transistor T4, such as M cascoded transistors T4, where M is a positive integer and is determined by circuit requirements. In one embodiment, sizes of the multiple transistors T4 may be equal. In some embodiments, the quantity M of the transistors T4 in the fourth set of switches SW4 is positively correlated to the maximum power of the RF signal Srx. Since breakdown voltages of respective transistors T4 are substantially equal, e.g., between 2.5V and 3V, the larger the maximum power of the RF signal Srx is, the larger the quantity M of the cascoded transistors T4 in the fourth set of switches SW4 may be, so as to avoid break-down of the transmission path Ptx when receiving a high-power RF signal Srx. Similarly, the larger the maximum power of the RF signal Stx is, the larger the quantity N of the cascoded transistors T1 in the first set of switches SW1 may be, so as to avoid break-down of the reception path Prx when transmitting a high-power RF signal Stx. In some embodiments, N may be less than M, for example, N may be 6, and M may be 8, but the invention is not limited thereto. In other embodiments, N may be equal to or greater than M, wherein the quantity N of the transistors T1 in the reception path Prx may be selected according to the maximum power of the RF signal Stx, and the quantity M of the transistors T4 in the transmission path Ptx may be selected according to the maximum power of the RF signal Srx. In further embodiments, the size of each transistor T1 may be equal to the size of each transistor T4.

As shown in FIGS. 1 and 2, in the reception path Prx, the amplification path Prx1 and the bypass path Prx2 are coupled in parallel between the second terminal of the first set of switches SW1 and the RF terminal RF2. The amplification path Prx1 may be used to amplify the RF signal Srx to generate an amplified signal Samp, and transmit the amplified signal Samp to the RF terminal RF2. The bypass path Prx2 may be a different signal path from the amplification path Prx1, and the bypass path Prx2 may allow the RF signal Srx to pass to the RF terminal RF2. In an embodiment, the amplification path Prx1 includes a second set of switches SW2 and an amplifier AMP. The second set of switches SW2 includes a first terminal coupled to the second terminal of the first set of switches SW1, and a control terminal configured to receive the control signal Sc2. The second set of switches SW2 is controlled to be on or off according to the control signal Sc2. The amplifier AMP includes an input terminal and an output terminal. The input terminal of the amplifier AMP is coupled to the second terminal of the second set of switches SW2 and is configured to receive the RF signal Srx. The output terminal of the amplifier AMP is coupled to the RF terminal RF2 and is configured to output the amplified signal Samp. The bypass path Prx2 includes a third set of switches SW3. The third set of switches SW3 includes a first terminal, a second terminal, and a control terminal. The first terminal of the third set of switches SW3 may be coupled to the second terminal of the first set of switches SW1, the second terminal of the third set of switches SW3 may be coupled to the RF terminal RF2, and the control terminal of the third set of switches SW3 may be configured to receive a control signal Sc3. The third set of switches SW3 may be controlled to be on or off according to the control signal Sc3. In some embodiments, the second set of switches SW2 may include at least one cascoded transistor T2, and the third set of switches SW3 may include at least one cascoded transistor T3. As shown in FIG. 2, for example, the second set of switches SW2 may include, but is not limited to, two transistors T2, and the third set of switches SW3 may include, but is not limited to, two transistors T3.

In FIG. 2, the front-end module 1 may further include a shunt path SH1, a shunt path SH2, a shunt path SH3, and a shunt path SH4.

For example, when the RF signals Stx is being transmitted via the transmission path Ptx to the RF terminals RF1, the first set of switches SW1, the second set of switches SW2, and the third set of switches SW3 may be all turned off, and the shunt path SH1 and the shunt path SH2 may be turned on. In such a case, sum of the quantity N of the transistors T1 in switches SW1 and the quantity P of the transistors T2 in switches SW2 (i.e., N+P) may be selected according to the maximum power of the RF signal Stx.

When the RF terminal RF1 receives the RF signal Srx, the fourth set of switches SW4 may be turned off. In such a case, the first set of switches SW1 and the second set of switches SW2 may be used to control the conduction state of the amplification path Prx1, and the first set of switches SW1 and the third set of switches SW3 may be used to control the conduction state of the bypass path Prx2. As described further below, by arranging the parallel amplification path Prx1 and the bypass path Prx2, and by further setting the sizes of the transistors in the second set of switches SW2 and the third set of switches SW3, the front-end module 1 in the embodiment of the present invention may operate at a faster switching speed.

In some embodiments, the shunt path SH1 includes a first terminal, a second terminal, and a control terminal. The first terminal of the shunt path SH1 is coupled to the second terminal of the second set of switches SW2, the second terminal of the shunt path SH1 is coupled to a reference voltage terminal GND, and the control terminal of the shunt path SH1 is configured to receive a control signal Ss1. The shunt path SH2 includes a first terminal, a second terminal, and a control terminal. The first terminal of the shunt path SH2 is coupled to the second terminal of the third set of switches SW3, the second terminal of the shunt path SH2 is coupled to the reference voltage terminal GND, and the control terminal of the shunt path SH2 is configured to receive a control signal Ss2. The shunt path SH1 may serve as a grounding path for the amplification path Prx1, and the shunt path SH2 may serve as a grounding path for the bypass path Prx2. The shunt path SH1 includes at least one transistor Ts1, and the shunt path SH2 includes at least one transistor Ts2. In some embodiments, the control signal Sc2 and the control signal Ss1 may be complementary signals to each other, and the control signal Sc3 and the control signal Ss2 may be complementary signals to each other. For example, when the RF signal Stx is transmitted from the RF terminal RF3 to the RF terminal RF1 via the transmission path Ptx, the first set of switches SW1 may be turned off according to the control signal Sc1 at a low level, and the fourth set of switches SW4 may be turned on according the control signal Sc4 at a high level. In such a case, the second set of switches SW2 and the third set of switches SW3 may be turned off (e.g., each transistor T2 and each transistor T3 are turned off) according to the control signals Sc2 and Sc3 at the low level (e.g., 0V, or −3V) respectively, and the shunt path SH1 and the shunt path SH2 may be turned on according to the control signals Ss1 and Ss2 at the high level respectively. In the embodiment, various low levels of the control signals Sc1, Sc2, and Sc3 are identical, for example, 0V or −3V. In other embodiments, various high levels of the control signals Sc1, Sc2, and Sc3 are also identical. The specific voltage levels are examples and are not intended to limit the present invention.

When the RF signal Srx is transmitted from the RF terminal RF1 to the RF terminal RF2 via the reception path Prx, the first set of switches SW1 is turned on according to the control signal Sc1, and the fourth set of switches SW4 is turned off according to the control signal Sc4. In such a case, if the power of the RF signal Srx is insufficient, e.g., less than a predetermined power, signal amplification may be required, and the RF signal Srx may be transmitted via the amplification path Prx1 where the second set of switches SW2 is ON and the third set of switches SW3 is OFF. In the embodiment, in order to reduce signal loss and/or power consumption, the shunt path SH1 is OFF (e.g., non-conductive), and the shunt path SH2 is ON (e.g., conductive). If the power of the RF signal Srx is sufficient, e.g., equal to or exceeding the predetermined power, signal amplification may be not required, and the RF signal Srx may be transmitted via the bypass path Prx2 where the second set of switches SW2 is OFF and the third set of switches SW3 is ON. In the embodiment, in order to reduce signal loss and/or power consumption, the shunt path SH1 is ON (e.g., conductive), and the shunt path SH2 is OFF (e.g., non-conductive).

In some embodiments, the shunt path SH4 includes a first terminal, a second terminal, and a control terminal. The first terminal of the shunt path SH4 is coupled to the second terminal of the fourth set of switches SW4, the second terminal of the shunt path SH4 is coupled to the reference voltage terminal GND, and the control terminal of the shunt path SH4 is configured to receive a control signal Ss4. The shunt path SH4 may include at least one transistor Ts4. The shunt path SH4 may serve as a grounding path for the transmission path Ptx. The control signal Sc4 and the control signal Ss4 may be complementary signals to each other. For example, when the fourth set of switches SW4 in the transmission path Ptx is turned on according to the control signal Sc4 at a high level, the shunt path SH4 is turned off according to the control signal Ss4 at a low level. When the fourth set of switches SW4 in the transmission path Ptx is turned off according to the control signal Sc4 at a low level, the shunt path SH4 is turned on according to the control signal Ss4 at a high level. In some embodiments, the reference voltage terminal GND may provide a reference voltage such as 0V.

As shown in FIG. 2, the quantity of the transistors T2 in the second set of switches SW2 is equal to the quantity of the transistors T3 in the third set of switches SW3, and equal to P. In some embodiments, sum N+P=M, where N is the quantity of the transistors T1, P is the quantity of the transistors T2 or T3, and M is the quantity of the transistors T4. For example, the quantity M of the transistors T4 may be 8, and the quantity N of the transistors T1 may be 6, and P=M−N may be 2. In another example, the quantity M of the transistors T4 may be 8, the quantity N of the transistors T1 may be 7, the quantity P of the transistors T2 and the quantity of the transistors T3 may each be 1 (=8−7). In another example, the quantity M of the transistors T4 may be 8, the quantity N of the transistors T1 may be 5, the quantity P of the transistors T2 and the quantity of the transistors T3 may each be 3 (=8−5).

However, the present disclosure may not be such limited. In other embodiments, sum N+P may be selected according to the maximum power of the RF signal Stx, and quantity M of the transistors T4 may be selected according to the maximum power of the RF signal Srx. In the embodiments, the sum N+P may be greater than quantity M of the transistors T4, that is N+P>M.

As described above, the size of each transistor T2 may be equal, and the size of each transistor T3 may be equal. In some embodiments, the size of each transistor T2 and the size of each transistor T3 may each be smaller than the size of each transistor T1. In another embodiment, a sum of the size of a transistor T2 and the size of a transistor T3 may be substantially equal to the size of a transistor T1. For example, the sum of the size of transistor T2 and the size of transistor T3 may be equal to the size of transistor T1+/−5%, +/−10%, or +/−50%.

In the embodiments, with lager-sized transistors arranged, the insertion loss and/or the noise figure may be reduced, but larger area may be taken up by the larger-sized transistors.

Accordingly, the amplification path Prx1 may be used to transmit the RF signal Srx having a lower power, and the bypass path Prx2 may be used to transmit the RF signal Srx having a higher power. Therefore, taking account of the insertion loss/noise figure and the area of the amplification path Prx1, it may be configured that the transistors T2 is larger-sized than the transistors T3. For example, when the size of the transistor T1 is A, the size of the transistor T2 may be 9A/10, and the size of the transistor T3 may be A/10, but the present invention is not limited thereto. In other embodiments, the size of the transistor T2 may be 8A/10, and the size of the transistor T3 may be 2A/10. Alternatively, the size of the transistor T2 may be 7A/10, and the size of the transistor T3 may be 3A/10. Alternatively, the size of the transistor T2 may be 6A/10, and the size of the transistor T3 may be 4A/10.

In some embodiments, sizes of the transistors T1, T2, and T3 may be positively correlated with finger widths thereof, respectively. For example, in an embodiment of the size of the transistor T1 being A, the size of the transistor T2 being 9A/10, and the size of the transistor T3 being A/10, the transistor T1 may occupy 100 fingers and the finger width may be 10 microns, the transistor T2 may occupy 100 fingers and the finger width may be 9 microns, and transistor T3 may occupy 100 fingers and the finger width may be 1 micron. Therefore, the size of T1 may be 10 microns*100 fingers, the size of transistor T2 may be 9 microns*100 fingers, and the size of transistor T3 may be 1 micron*100 fingers. In other embodiments, the size of the transistors T1, T2, and T3 may be positively correlated with the quantities of fingers thereof, respectively. For example, the transistors T1 may occupy 100 fingers and the finger width may be 10 microns, the transistor T2 may occupy 90 fingers and the finger width may be 10 microns, and the transistor T3 may occupy 10 fingers and the finger width may be 10 micron. Therefore, the size of the transistors T1 may be 10 microns*100 fingers, the size of the transistors T2 may be 10 microns*90 fingers, and the size of the transistors T3 may be 10 microns*10 fingers.

Figure 3:
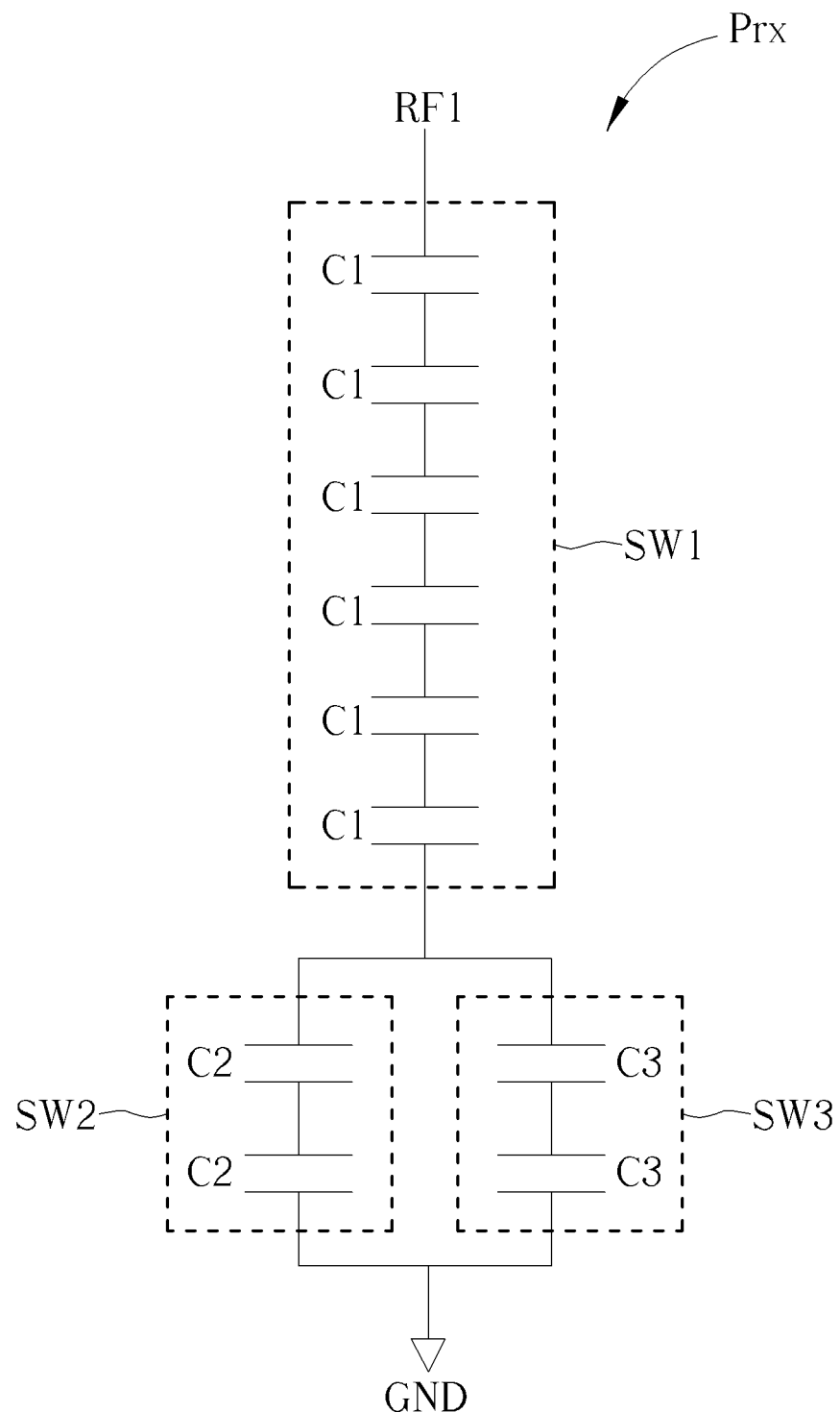
FIG. 3 is an equivalent circuit diagram of the front-end module in FIG. 2 when the reception path is not conductive.

FIG. 3 is an equivalent circuit diagram when the reception path Prx is non-conductive. In FIG. 3, M is equal to 8 and N is equal to 6. When the reception path Prx is non-conductive (e.g., OFF), the first set of switches SW1, the second set of switches SW2, and the third set of switches SW3 are turned off, and the shunt paths SH1, SH2 are turned on. The first set of switches SW1 may be equivalent to 6 serially connected capacitors C1. Each capacitor C1 corresponds to a turn-off transistor T1 having a size of A. The second set of switches SW2 may be equivalent to 2 serially connected capacitors C2. Each capacitor C2 corresponds to a turn-off transistor T2 having a size of 9A/10. The third set of switches SW3 may be equivalent to 2 serially connected capacitors C3. Each capacitor C3 corresponds to a turn-off transistor T3 having a size of A/10. For the reception path Prx in FIG. 3, an equivalent capacitance thereof is equal to that of 8 serially connected capacitors having the size of A. In this embodiment, the voltages across respective capacitors C1 are substantially equal. Similarly, the voltages across respective capacitors C2 are substantially equal, and the voltages across respective capacitors C3 are substantially equal. In another embodiment, the voltage across each capacitor C1 is substantially equal to the voltage across each capacitor C2, and is substantially equal to the voltage across each capacitor C3. In some embodiments, the difference in voltages across any two of the capacitor C1, the capacitor C2, and the capacitor C3 is within 1%.

Referring to FIG. 2, the amplification path Prx1 may include a capacitor C and an inductor L coupled in series thereto. The capacitor C includes a first terminal and a second terminal. The first terminal of the capacitor C is coupled to the second terminal of the second set of switches SW2. The inductor L includes a first terminal and a second terminal. The first terminal of the inductor L is coupled to the second terminal of the capacitor C, and the second terminal of the inductor L is coupled to the input terminal of the amplifier AMP. There may or may not be other components present between the capacitor C and the inductor L.

The front-end module 1 may include a fifth set of switches SW5 and a sixth set of switches SW6 to enhance isolation between the bypass path Prx2 and the amplification path Prx1. The sixth set of switches SW6 includes a first terminal, a second terminal, and a control terminal. The first terminal of the sixth set of switches SW6 is coupled to the output terminal of the amplifier AMP, the second terminal of the sixth set of switches SW6 is coupled to the RF terminal RF2, and the control terminal of the sixth set of switches SW6 is configured to receive a control signal Sc6. The sixth set of switches SW6 is controlled to be on or off according to the control signal Sc6. The sixth set of switches SW6 may include one or more transistors T6, e.g., 1 transistor T6. The fifth set of switches SW5 includes a first terminal, a second terminal, and a control terminal. The first terminal of the fifth set of switches SW5 may be coupled to the second terminal of the third set of switches SW3, the second terminal of the fifth set of switches SW5 may be coupled to the RF terminal RF2, and the control terminal of the fifth set of switches SW5 may be configured to receive a control signal Sc5. The fifth set of switches SW5 may be controlled to be on or off according to the control signal Sc5. The fifth set of switches SW5 may include one or more transistors T5, e.g., 2 cascoded transistors T5. When the RF signal Srx is transmitted to the RF terminal RF2 via the amplification path Prx1, the sixth set of switches SW6 is turned on, and the fifth set of switches SW5 is turned off to prevent the signal from being transmitted via the bypass path Prx2. When the RF signal Srx is transmitted to the RF terminal RF2 via the bypass path Prx2, the fifth set of switches SW5 is turned on, and the sixth set of switches SW6 is turned off to prevent the signal from being transmitted via the amplification path Prx1.

The front-end module 1 may further include a shunt path SH3 including a first terminal, a second terminal, and a control terminal. The first terminal of the shunt path SH3 is coupled to the RF terminal RF2, the second terminal of the shunt path SH3 is coupled to the reference voltage terminal GND, and the control terminal of the shunt path SH3 is configured to receive a control signal Ss3. When transmitting the RF signal Stx, the shunt path SH3 may be turned on. The shunt path SH3 includes at least one transistor Ts3.

Compared to the reception path including M transistors T1, the reception path Prx in the present invention includes a smaller quantity of N transistors T1. In some embodiments, during transmission of the RF signal Stx, the transmission path Ptx is conductive and reception path Prx is non-conductive, wherein the first set of switches SW1, the second set of switches SW2 and the third set of switches SW3 in the reception path Prx are all turned off, so that the power handling capability of the front-end module 1 at the time is determined by the first set of switches SW1, the second set of switches SW2, and the third set of switches SW3. It may be seen from the equivalent circuit in FIG. 3 that, by configuring the M-N transistors T2 and the M-N transistors T3 each smaller than the size of the transistor T1, the switching speed may be increased without significantly affecting the power handling capability.

Figure 4:
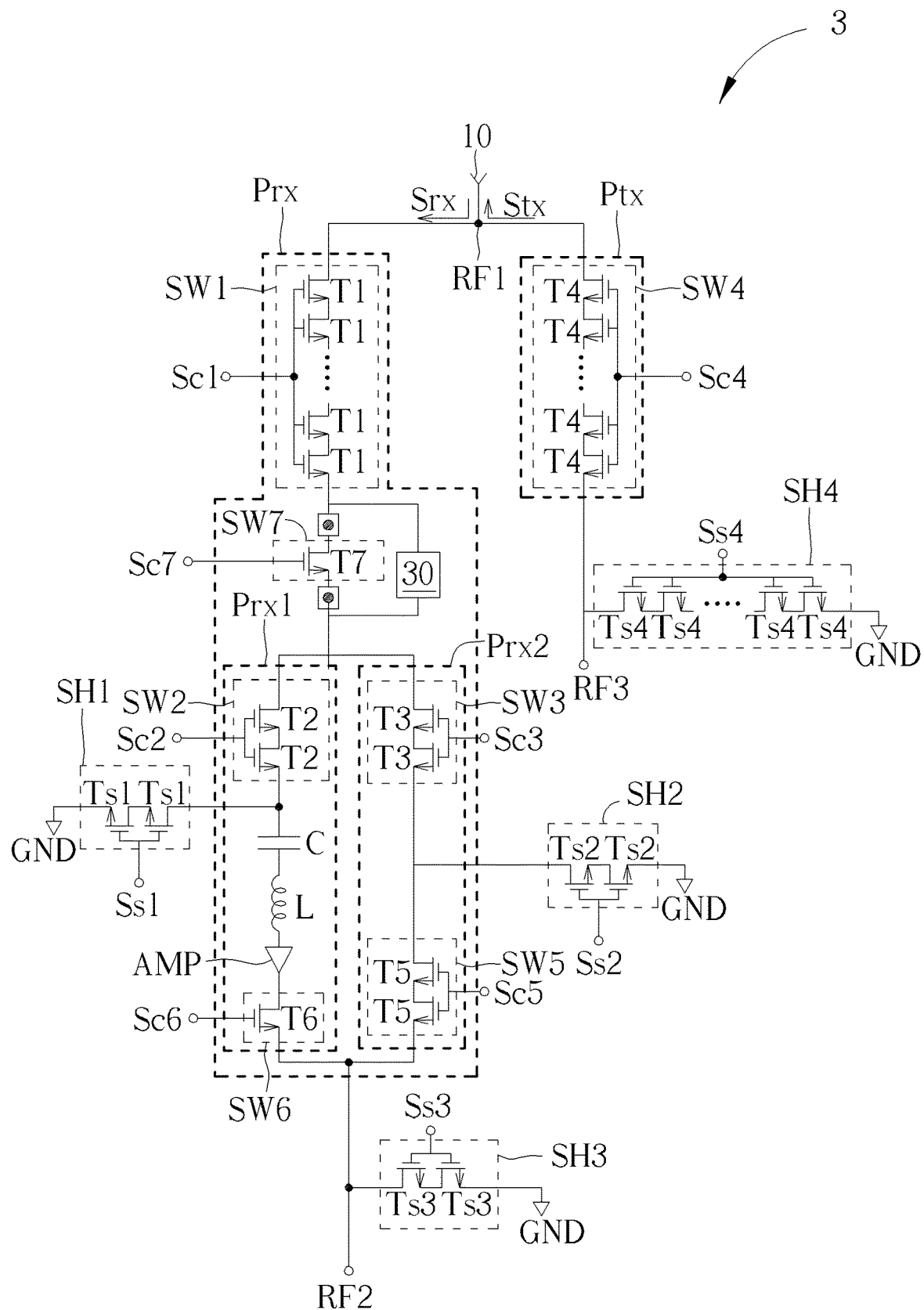
FIG. 4 is a circuit diagram of a front-end module according to another embodiment of the invention.

FIG. 4 is a schematic circuit diagram of another front-end module 3 according to an embodiment of the present invention. The front-end module 3 is similar to the front-end module 1, except that the front-end module 3 further includes a filter 30 and a seventh set of switches SW7. The differences between the front-end module 3 and the front-end module 1 will be explained as follows.

The filter 30 is coupled between the second terminal of the first set of switches SW1 and the first terminal of the second set of switches SW2. The seventh set of switches SW7 is coupled in parallel to the filter 30. The seventh set of switches SW7 may include one or more transistors T7, e.g., 1 transistor T7.

The filter 30 may be a low-pass filter to filter out noise from the RF signal Srx. When the power of the noise in the RF signal Srx exceeds a noise threshold, the seventh set of switches SW7 may be turned off, so as to transmit the RF signal Srx via the filter 30 to the amplification path Prx1 or the bypass path Prx2, reducing the noise while enhancing the signal quality. When the power of the noise in the RF signal Srx is less than the noise threshold, the seventh set of switches SW7 may be turned on, so as to transmit the RF signal Srx to the amplification path Prx1 or the bypass path Prx2 without passing through the filter 30, reducing the insertion loss resulted from the filter 30. The filter 30 may be controlled to filter out the noise from the RF signal Srx or not according to the signal Sc7, so as to achieve a better signal quality or a reduced the insertion loss.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A front-end module comprising:
   a first radio frequency (RF) terminal;
   a second RF terminal;
   a third RF terminal;
   a transmission path formed between the first RF terminal and the third RF terminal; and
   a reception path formed between the first RF terminal and the second RF terminal, the reception path comprising:
      a first set of switches comprising a first terminal coupled to the first RF terminal; a second terminal; and a control terminal configured to receive a first control signal, the first set of switches being controlled to be on or off according to the first control signal;
      a first path comprising:
         a second set of switches comprising a first terminal coupled to the second terminal of the first set of switches; a second terminal; a control terminal configured to receive a second control signal; and at least one second transistor, the second set of switches being controlled to be on or off according to the second control signal; and
         an amplifier comprising an input terminal coupled to the second terminal of the second set of switches and configured to receive a receive signal, and an output terminal coupled to the second RF terminal and configured to output an amplified signal; and
      a second path, the first path and the second path being coupled in parallel between the second terminal of the first set of switches and the second RF terminal, the second path comprising:
         a third set of switches comprising a first terminal coupled to the second terminal of the first set of switches; a second terminal coupled to the second RF terminal; a control terminal configured to receive a third control signal; and at least one third transistor, the third set of switches being controlled to be on or off according to the third control signal;
   wherein when transmitting a transmission signal to the first RF terminal via the transmission path, the first set of switches, the second set of switches, and the third set of switches are all turned off; and
   a size of each of the at least one second transistor exceeds a size of each of the at least one third transistor.

2. The front-end module of claim 1, wherein the transmission path comprises:
   a fourth set of switches comprising a first terminal coupled to the first RF terminal; a second terminal coupled to the third RF terminal; and a control terminal configured to receive a fourth control signal, the fourth set of switches being controlled to be on or off according to the fourth control signal;
   the first set of switches further comprising at least one first transistor;
   the fourth set of switches further comprising at least one fourth transistor; and
   a quantity of the at least one second transistor is equal to a quantity of the at least one third transistor.

3. The front-end module of claim 2, wherein a sum of a size of each of the at least one second transistor and a size of each of the at least one third transistor is substantially equal to a size of each of the at least one first transistor.

4. The front-end module of claim 2, wherein
   the first set of switches comprises N first transistors, N being a positive integer;
   the fourth set of switches comprises M fourth transistors, M being a positive integer;
   the second set of switches comprises P second transistors, and the third set of switches comprises P third transistors, P being a positive integer; and wherein, $N+P \geq M$.

5. The front-end module of claim 1, wherein when the receive signal is transmitted to the second RF terminal via the first path, the first set of switches is turned on, the second set of switches is turned on, and the third set of switches is turned off.

6. The front-end module of claim 1, wherein when the receive signal is transmitted to the second RF terminal via the second path, the first set of switches is turned on, the second set of switches is turned off, and the third set of switches is turned on.

7. The front-end module of claim 1, further comprising:
   a first shunt path comprising a first terminal coupled to the second terminal of the second set of switches, and a second terminal coupled to a reference voltage terminal; and
   a second shunt path comprising a first terminal coupled to the second terminal of the third set of switches, and a second terminal coupled to the reference voltage terminal;
   wherein when transmitting the receive signal to the second RF terminal via the first path, the first shunt path is non-conductive, and the second shunt path is conductive; and when transmitting the receive signal to the second RF terminal via the second path, the first shunt path is conductive, and the second shunt path is non-conductive.

8. The front-end module of claim 1, further comprising:
a fifth set of switches comprising a first terminal coupled to the second terminal of the third set of switches; a second terminal coupled to the second RF terminal; and a control terminal configured to receive a fifth control signal, the fifth set of switches being controlled to be on or off according to the fifth control signal; and
a sixth set of switches comprising a first terminal coupled to the output terminal of the amplifier; a second terminal coupled to the second RF terminal; and a control terminal configured to receive a sixth control signal, the sixth set of switches being controlled to be on or off according to the sixth control signal;
wherein when transmitting the receive signal to the second RF terminal via the first path, the fifth set of switches is turned off, and the sixth set of switches is turned on; and
when transmitting the receive signal to the second RF terminal via the second path, the fifth set of switches is turned on, and the sixth set of switches is turned off.

9. The front-end module of claim 1, further comprising a third shunt path comprising a first terminal coupled to the second RF terminal, and a second terminal coupled to the reference voltage terminal.

10. The front-end module of claim 1, wherein the first path further comprises:
a capacitor; and
an inductor coupled to the capacitor in series.

11. The front-end module of claim 1, further comprising:
a filter coupled between the second terminal of the first set of switches and the first terminal of the second set of switches; and
a seventh set of switches coupled in parallel to the filter.

12. A front-end module comprising:
a first RF terminal;
a second RF terminal;
a first set of switches comprising a first terminal coupled to the first RF terminal; a second terminal; a control terminal configured to receive a first control signal; and at least one first transistor, the first set of switches being controlled to be on or off according to the first control signal;
a second set of switches comprising a first terminal coupled to the second terminal of the first set of switches; a second terminal; a control terminal configured to receive a second control signal; and at least one second transistor, the second set of switches being controlled to be on or off according to the second control signal; and
a third set of switches comprising a first terminal coupled to the second terminal of the first set of switches; a second terminal coupled to the second RF terminal; a control terminal configured to receive a third control signal; and at least one third transistor, the third set of switches being controlled to be on or off according to the third control signal;
wherein a size of each of the at least one second transistor and a size of each of the at least one third transistor are each less than a size of each of the at least one first transistor.

13. The front-end module of claim 12, wherein a sum of the size of each of the at least one second transistor and the size of each of the at least one third transistor is substantially equal to the size of each of the at least one first transistor.

14. A front-end module comprising:
a first radio frequency (RF) terminal;
a second RF terminal;
a first set of switches comprising a first terminal coupled to the first RF terminal; a second terminal; a control terminal configured to receive a first control signal; and at least one first transistor, the first set of switches being controlled to be on or off according to the first control signal;
a second set of switches comprising a first terminal coupled to the second terminal of the first set of switches; a second terminal; a control terminal configured to receive a second control signal; and at least one second transistor, the second set of switches being controlled to be on or off according to the second control signal; and
a third set of switches comprising a first terminal coupled to the second terminal of the first set of switches; a second terminal coupled to the second RF terminal; and a control terminal configured to receive a third control signal; and at least one third transistor, the third set of switches being controlled to be on or off according to the third control signal;
a first shunt path comprising a first terminal coupled to the second terminal of the second set of switches, and a second terminal coupled to a reference voltage terminal; and
a second shunt path comprising a first terminal coupled to the second terminal of the third set of switches, and a second terminal coupled to the reference voltage terminal;
wherein a quantity of the at least one second transistor is equal to a quantity of the at least one third transistor; and
when the first set of switches, the second set of switches, and the third set of switches are all turned off, a voltage across each of the at least one first transistor is substantially equal to a voltage across each of the at least one second transistor, and is substantially equal to a voltage across each of the at least one third transistor.

15. The front-end module of claim 14, wherein when the first set of switches, the second set of switches, and the third set of switches are all turned off,
the at least one first transistor, the at least one second transistor, and the at least one third transistor are all turned off, and
a level of the first control signal, a level of the second control signal, and a level of the third control signal are all equal.

16. The front-end module of claim 14, wherein:
the size of each of the at least one first transistor is positively correlated to a finger width of each of the at least one first transistor;
the size of each of the at least one second transistor is positively correlated to a finger width of each of the at least one second transistor; and
the size of each of the at least one third transistor is positively correlated to a finger width of each of the at least one third transistor.

17. The front-end module of claim 14, wherein:
the size of each of the at least one first transistor is positively correlated to a quantity of fingers of each of the at least one first transistor;

the size of each of the at least one second transistor is positively correlated to a quantity of fingers of each of the at least one second transistor; and the size of each of the at least one third transistor is positively correlated to a quantity of fingers of each of the at least one third transistor.

\* \* \* \* \*